United States Patent
Dutta et al.

(10) Patent No.: US 11,671,815 B2
(45) Date of Patent: Jun. 6, 2023

(54) FREQUENCY RANGE 2 (FR2) SIDELINK DISCOVERY

(71) Applicant: QUALCOMM Incorporated, San Diego, CA (US)

(72) Inventors: Sourjya Dutta, San Diego, CA (US); Kapil Gulati, Belle Mead, NJ (US); Hong Cheng, Basking Ridge, NJ (US); Junyi Li, Franklin Park, NJ (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 83 days.

(21) Appl. No.: 17/131,223

(22) Filed: Dec. 22, 2020

(65) Prior Publication Data

US 2022/0201459 A1     Jun. 23, 2022

(51) Int. Cl.
*H04W 8/00*     (2009.01)
*H04W 76/14*     (2018.01)
(Continued)

(52) U.S. Cl.
CPC ........... *H04W 8/005* (2013.01); *H04L 5/1469* (2013.01); *H04W 48/04* (2013.01); *H04W 48/16* (2013.01);
(Continued)

(58) Field of Classification Search
CPC ..... H04W 8/005; H04W 48/04; H04W 48/16; H04W 74/0833; H04W 76/14;
(Continued)

(56) References Cited

U.S. PATENT DOCUMENTS

2016/0337935 A1* 11/2016 Patil ...................... H04L 5/0048
2017/0019886 A1* 1/2017 Patel ..................... H04W 76/14
(Continued)

FOREIGN PATENT DOCUMENTS

WO    WO-2020032869 A1    2/2020

OTHER PUBLICATIONS

3GPP TS 23.303: "3rd Generation Partnership Project; Technical Specification Group Services and System Aspects; Proximity-Based Services (ProSe); Stage 2 (Release 16)", 3GPP Standard, Technical Specification, 3GPP TS 23.303, 3rd Generation Partnership Project (3GPP), Mobile Competence Centre, 650, Route Des Lucioles, F-06921 Sophia-Antipolis Cedex, France, vol. SA WG2, No. V16. 0.0, Jul. 9, 2020 (Jul. 9, 2020), pp. 1-130, XP051924379, Retrieved from the Internet: URL: ftp://ftp.3gpp.org/Specs/archive/23_series/ 23.303/23303-g00.zip 23303-g00.doc [retrieved on Jul. 9, 2020] chapter 5.3.7 with chapters 4.6.4.3, 4.6.4.9, 4.6.4.10, chapters 3.1, 4.3.1, 4.4.1.1, 4.6.4.1-4.6.4.2b, 4.6.4.11, 4.6.4.12, 5.3.1.2, 5.3.2-5. 3.6A.2.3, 5.5.4-5.5.9, B.

(Continued)

*Primary Examiner* — Hassan A Phillips
*Assistant Examiner* — Hicham B Foud
(74) *Attorney, Agent, or Firm* — Patterson + Sheridan, L.L.P.

(57) ABSTRACT

Certain aspects of the present disclosure to techniques for sidelink discovery in millimeter wave (e.g., Frequency Range 2 (FR2), or 24.25 GHz to 52.6 GHz) bands. For example, the disclosed techniques provides generating a sidelink discovery message including device information of the UE and non-device information. The sidelink discovery message is outputted for transmission. A sidelink connection with a receiver (Rx) UE can then be established after the output of the sidelink discovery message. Very often, beam training is required for FR2 communications. After beam sweep, the transmitter (Tx) UE and the Rx UE become aware of the primary beam directions and need to discover each other on a device level, by associating a beam pair link to a peer UE. As FR2 link often have high overhead to establish and maintain, the disclosed techniques enables device level and service level discovery using the discover message.

26 Claims, 10 Drawing Sheets

(51) Int. Cl.
   *H04L 5/14*      (2006.01)
   *H04W 48/04*     (2009.01)
   *H04W 48/16*     (2009.01)
   *H04W 74/08*     (2009.01)
   *H04W 92/18*     (2009.01)

(52) U.S. Cl.
   CPC ....... *H04W 74/0833* (2013.01); *H04W 76/14* (2018.02); *H04W 92/18* (2013.01)

(58) Field of Classification Search
   CPC . H04W 92/18; H04W 16/28; H04W 28/0268; H04W 4/023; H04W 4/029; H04W 4/40; H04W 4/70; H04W 72/0453; H04W 72/046; H04W 80/02; H04W 4/02; H04W 88/04; H04L 5/1469; H04L 67/51; H04B 7/0695; H04B 7/088
   See application file for complete search history.

(56) References Cited

U.S. PATENT DOCUMENTS

| | | | |
|---|---|---|---|
| 2017/0041974 A1* | 2/2017 | Liao | H04B 7/0617 |
| 2019/0222967 A1* | 7/2019 | Ratilainen | H04W 4/70 |
| 2020/0322774 A1 | 10/2020 | Vargas et al. | |
| 2021/0168574 A1* | 6/2021 | Zhang | H04W 56/001 |
| 2021/0315032 A1* | 10/2021 | Hu | H04W 8/24 |
| 2021/0329487 A1* | 10/2021 | Wang | H04W 28/24 |
| 2022/0029691 A1* | 1/2022 | Yu | H04W 76/19 |
| 2022/0069884 A1* | 3/2022 | Zhang | H04B 17/318 |

OTHER PUBLICATIONS

3GPP TS 24.334: "3rd Generation Partnership Project; Technical Specification Group Core Network and Terminals; Proximity-Services (ProSe) User Equipment (UE) to ProSe Function Protocol Aspects; Stage 3 (Release 17)", 3GPP Standard, Technical Specification, 3GPP TS 24.334, 3rd Generation Partnership Project (3GPP), Mobile Competence Centre, 650, Route Des Lucioles, F-06921 Sophia-Antipolis Cedex, France, vol. CT WG1, No. V17.0.0, Dec. 18, 2020 (Dec. 18, 2020), pp. 1-264, XP051999958, Retrieved from the Internet: URL: https://ftp.3gpp.org/Specs/latest/Rel-17/24_series/24334-h00.zip 24334-h00.doc [retrieved on Dec. 18, 2020] chapters 10A2.2-10A.2.12, 11.2.5, chapters 5-7.2.8.3, 12.2.2-12.3.2.5, 13.2.

Huawei, et al., "Sidelink Discovery for NRV2X", 3GPP Draft, R1-1903068, 3GPP TSG RAN WG1 Meeting #96, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051600764, 6 Pages, Retrieved from the Internet: URL: http://www.3gpp.org/ftp/tsg%5Fran/WG1%5FRL1/TSGR1%5F96/Docs/R1%2D1903068%2Ezip [retrieved on Feb. 15, 2019] chapters 3, 4.

International Search Report and Written Opinion—PCT/US2021/057265—ISA/EPO—dated Feb. 16, 2022.

\* cited by examiner

FREQUENCY RANGE 2 (FR2) SIDELINK DISCOVERY

BACKGROUND

Field of the Disclosure

Aspects of the present disclosure relate to wireless communications, and more particularly, to techniques for sidelink communication and beam management.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description" one will understand how the features of this disclosure provide advantages that include improved feedback signaling.

Certain aspects provide a method for wireless communications by a user equipment (UE). The method includes generating a sidelink discovery message including device information of the UE and non-device information; outputting the sidelink discovery message for transmission; and establishing a sidelink connection with a receiver (Rx) UE after the output of the sidelink discovery message.

Certain aspects provide a method for wireless communications. The method includes detecting a sidelink discovery message including device information and non-device information of a transmitter (Tx) UE; and establishing a sidelink connection with the Tx UE based on the sidelink discovery message.

Certain aspects provide a user equipment (UE). The UE generally includes a processing system configured to generate a sidelink discovery message including device information of the UE and non-device information; and a transmitter configured to transmit the sidelink discovery message, wherein the processing system is further configured to establish a sidelink connection with a receiver (Rx) UE after the output of the sidelink discovery message.

Certain aspects provide a UE. The UE generally includes at least one antenna; and a processing system configured to detect, via the at least one antenna, a sidelink discovery message including device information and non-device information of a transmitter (Tx) UE and establish, via the at least one antenna, a sidelink connection with the Tx UE based on the sidelink discovery message.

Certain aspects provide an apparatus for wireless communications by a UE. The apparatus generally includes a processing system configured to generate a sidelink discovery message including device information of the UE and non-device information; and an interface configured to output the sidelink discovery message for transmission, wherein the processing system is further configured to establish a sidelink connection with a receiver (Rx) UE after the output of the sidelink discovery message.

Certain aspects provide an apparatus for wireless communications by a UE. The apparatus generally includes a processing system configured to: detect a sidelink discovery message including device information and non-device information of a transmitter (Tx) UE; and establish a sidelink connection with the Tx UE based on the sidelink discovery message.

Certain aspects provide an apparatus for wireless communications by a UE. The apparatus generally includes means for generating a sidelink discovery message including device information of the UE and non-device information; means for outputting the sidelink discovery message for transmission; and means for establishing a sidelink connection with a receiver (Rx) UE after the output of the sidelink discovery message.

Certain aspects provide an apparatus for wireless communications by a UE. The apparatus generally includes means for detecting a sidelink discovery message including device information and non-device information of a transmitter (Tx) UE; and means for establishing a sidelink connection with the Tx UE based on the sidelink discovery message.

Certain aspects provide a computer-readable medium for wireless communications by a UE. The computer-readable medium generally includes codes being executable to generate a sidelink discovery message including device information of the UE and non-device information; output the sidelink discovery message for transmission; and establish a sidelink connection with a receiver (Rx) UE after the output of the sidelink discovery message.

Certain aspects provide a computer-readable medium for wireless communications by a UE. The computer-readable medium generally includes codes being executable to detect a sidelink discovery message including device information and non-device information of a transmitter (Tx) UE; and establish a sidelink connection with the Tx UE based on the sidelink discovery message.

Aspects of the present disclosure provide UEs, means for, apparatuses, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
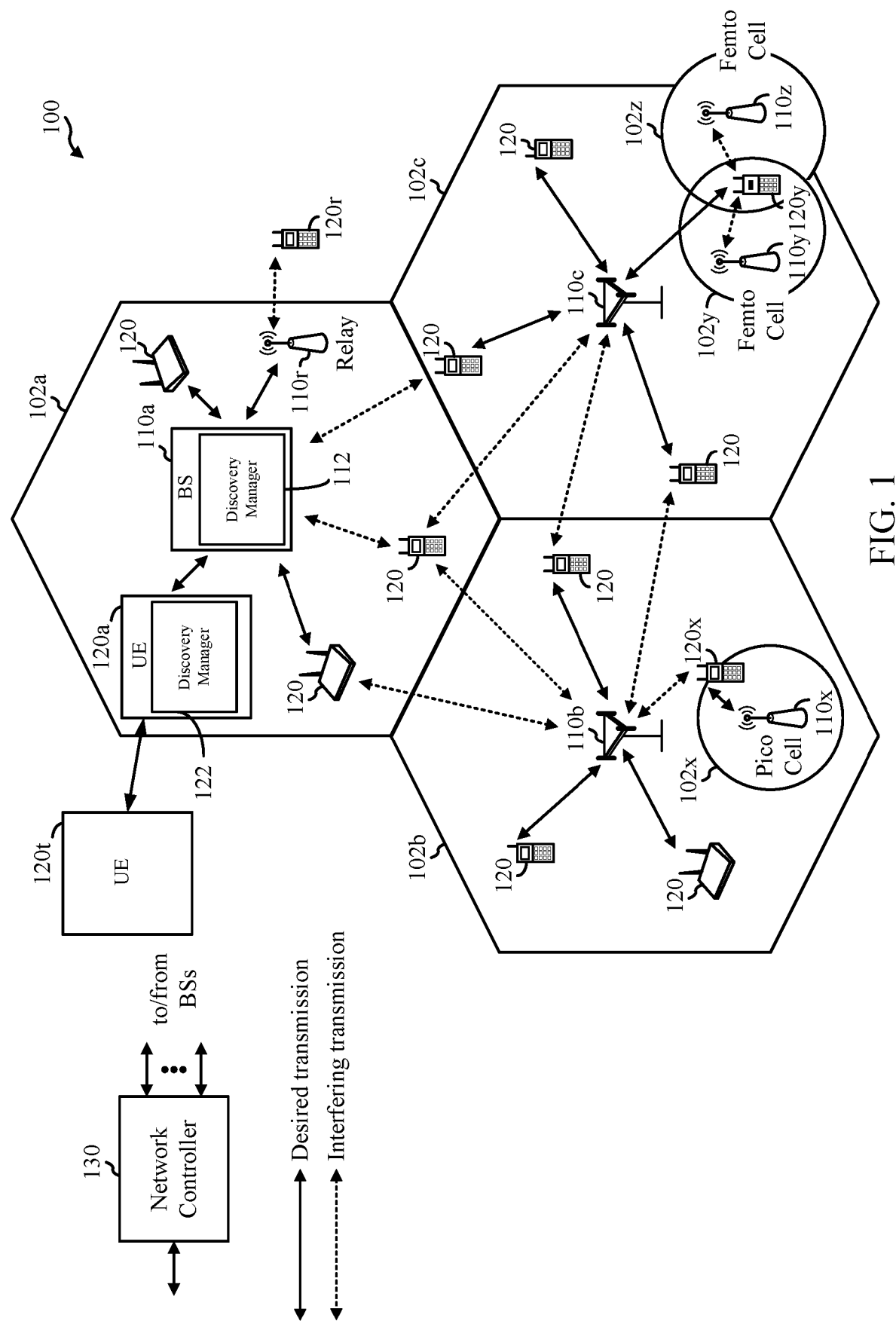
FIG. 1 is a block diagram conceptually illustrating an example telecommunications system, in accordance with certain aspects of the present disclosure.

Aspects of the present disclosure provide apparatus, methods, processing systems, and computer readable mediums for sidelink discovery. For example, the disclosed techniques provides generating a sidelink discovery message including device information of the UE and non-device information. The sidelink discovery message is outputted for transmission. A sidelink connection with a receiver (Rx) UE can then be established after the output of the sidelink discovery message. Very often, beam training is required for high frequency (such as Frequency Range 2, or 24.25 GHz to 52.6 GHz) communications. After beam sweep, the transmitter (Tx) UE and the Rx UE become aware of the primary beam directions and need to discover each other on a device level, by associating a beam pair link to a peer UE. As FR2 link often have high overhead to establish and maintain, the disclosed techniques enables device level and service level discovery using the discover message. Furthermore, the discovery message may contain beam forming information for reception and future beam association.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method, which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network.

In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. In some cases, the UE 120a may establish sidelink communication with the UE 120t, which may or may not be covered by another cell or base station, such as the macro cell 102a or the base station 110a. As further discussed in various examples below, the UE 120a and 120t may establish sidelink communications using millimeter waves, without relying on the base station 110a.

According to certain aspects, the UEs 120 may be configured to perform discovery operations. As shown in FIG. 1, the UE 120a includes a discovery manager 122. The discovery manager 122 may be configured to perform discovery operations for reselection of a relay UE, as described in more detail herein. The BS 110 may also include a discovery manager 112. The discovery manager 112 may configure resources for relay selection using discovery messages, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
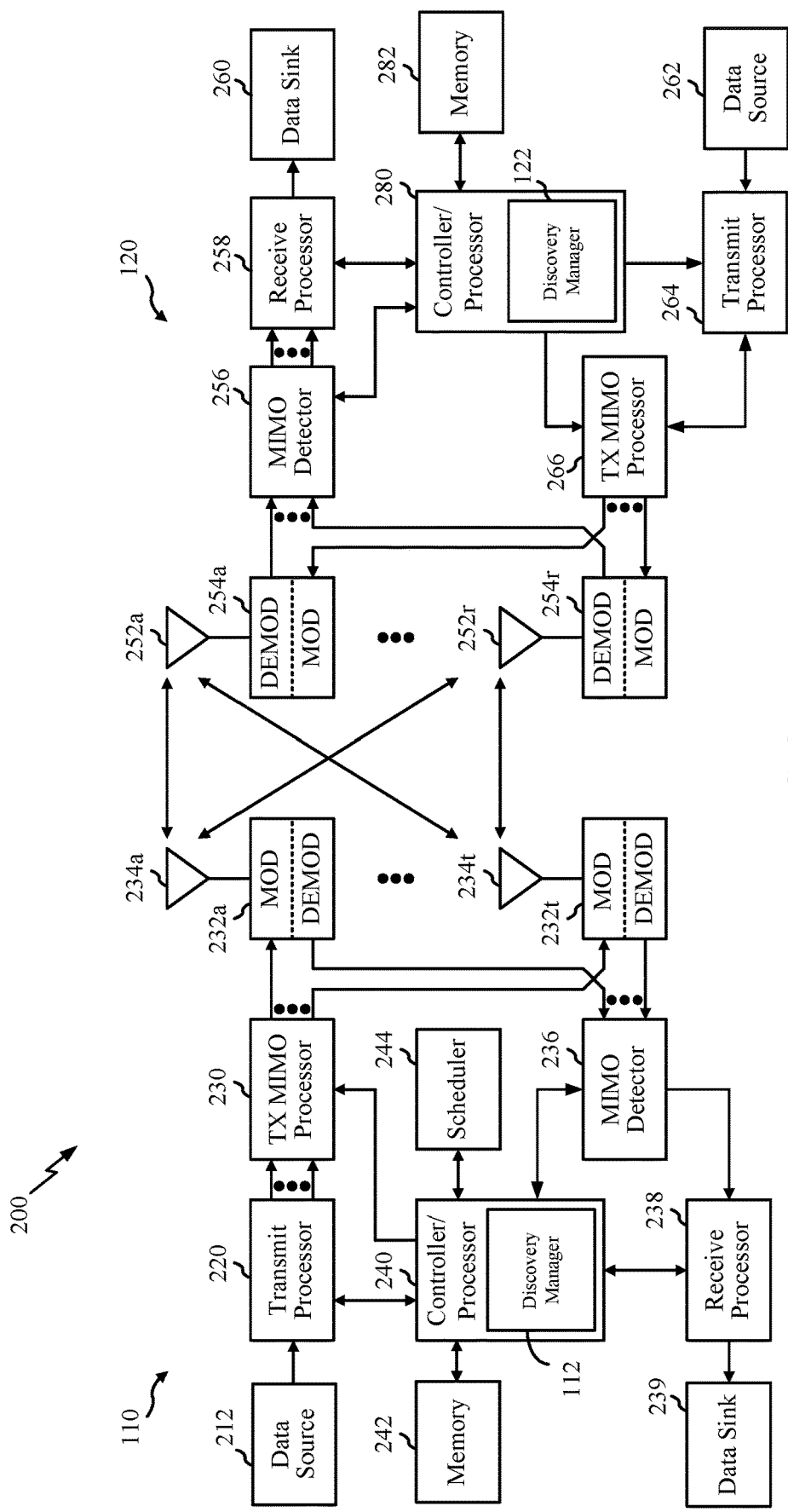
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the discovery manager 122, and the controller/processor 280 of the BS 110 has the discovery manager 112. Although shown at the Controller/Processor, other components of the UE 120a may be used performing the operations described herein.

Figure 3B:
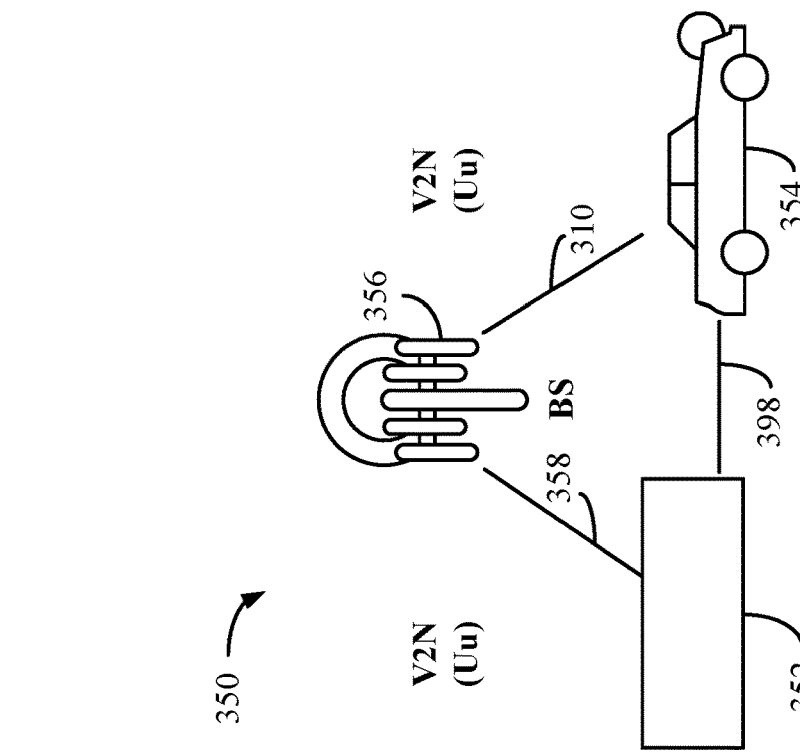
FIGS. 3A and 3B show diagrammatic representations of example vehicle to everything (V2X) systems in accordance with some aspects of the present disclosure.
Figure 3A:
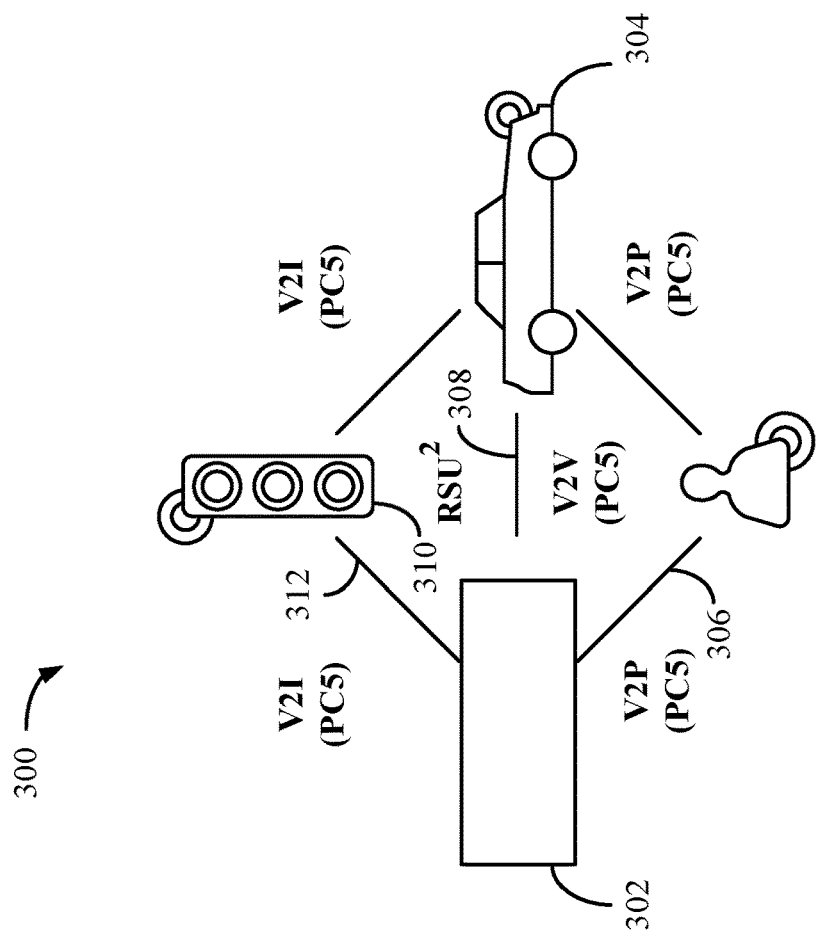

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Discovery Techniques for Sidelink Beam Training

For long-term evolution (LTE), discovery pool and communication pool may be separately configured in a radio resource control (RRC) reconfiguration message, system information block (SIB), or may be preconfigured (e.g., in a standard). For example, common communication pools may be provided in LTE SIB18, and common discovery pools may be provided in LTE SIB19, for UE's in idle mode of operation. A common pool of resources generally refers to resources available to multiple UEs for a particular purpose (e.g., data communication or discovery). Common communication and discovery pools may be separately provided in pre-configuration for out-of-coverage (OOC) UEs. Dedicated communication and discovery pools may be separately provided in RRC reconfiguration message for UEs in a connected mode of operation. A dedicated pool of resources generally refers to resources dedicated to a particular UE for communication or discovery.

In some cases, transmit (TX) and receive (RX) pools may be configured. For example, a common TX pool may be configured in SIB or preconfigured. The common TX pool may be overwritten by dedicated configuration via RRC reconfiguration message. RX pool may always be common across UEs for LTE, and may be only provided (e.g., configured) via RRC message upon handover (HO) from one cell to another. An RX pool may be agnostic to the RRC state of the UE. In some implementations, dedicated assignment of resources may only be configured for a TX pool.

There are various differences between discovery and communication pools. For example, sidelink control information (SCI) may not be used for discovery messages. Both communication and discovery pools may be defined by a periodic subframe pool of resources in time domain and periodic pool of resource blocks (RBs) in frequency domain. Communication pool and discovery pool may share the same RB pool definition in LTE. For example, the bandwidth for discovery and communication pools may be 2 RB to 200 RB, and the start position of the pools of resources may be configurable. For a communication pool, separate frequency allocations may be defined for control and data transmissions. The communication pool and discovery pool may use different periodicity configurations. For instance, the periodicity of communication pool may be 40 ms to 320 ms, but the periodicity for discovery pool may be 320 ms to 10.24 seconds. In other words, communication pools may be denser than discovery pools.

Figure 4A:
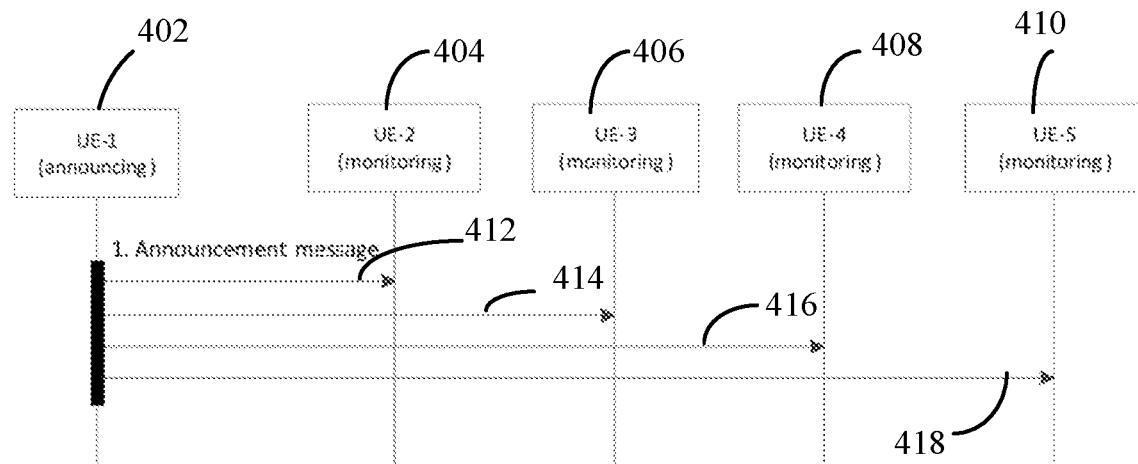
FIGS. 4A and 4B illustrate messages for discovery in sidelink.
Figure 4B:
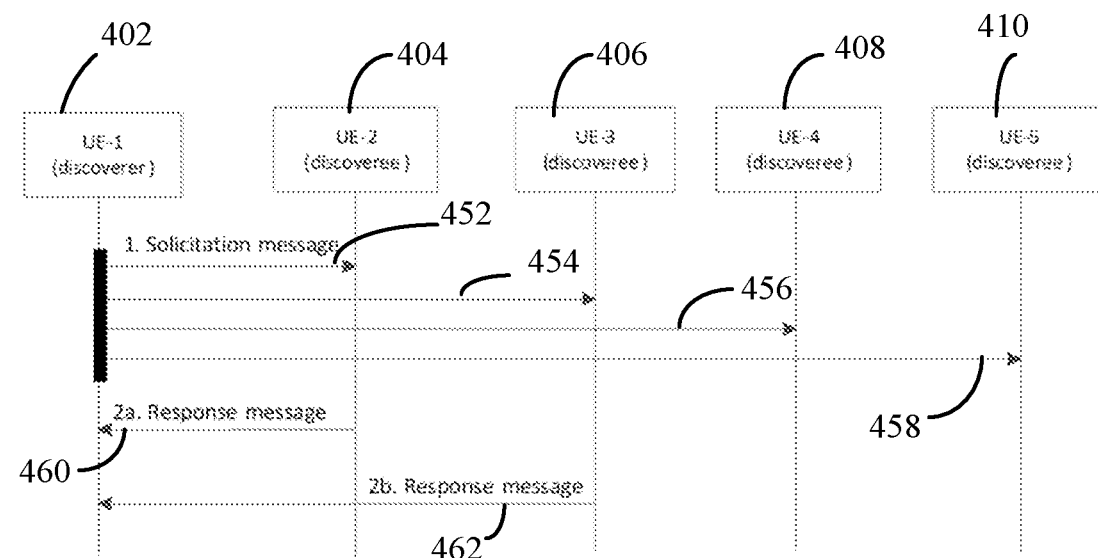

FIGS. 4A and 4B illustrate messages for discovery in sidelink. FIG. 4A illustrates a discovery protocol referred to as "Model A" discovery. As illustrated, UE 402 may transmit announcement messages 412, 414, 416, 418 (also referred to as "discovery announcement" below). The announcement messages may be received by other UEs 404, 406, 408, 410 that may be monitoring for the announcement messages. The announcement messages may be sent in a PC5 communication channel, as described with respect to FIG. 3. Once received, one or more of the announcement messages may be used for the UE 402 to connect with one or more of UEs 404, 406, 408, 410.

FIG. 4B illustrates a discovery protocol referred to as "Model B" discovery. As illustrated, UE 402 may be a discoverer UE and may be transmitting solicitation messages 452, 454, 456, 458 (also referred to as "discovery advertisement" below). The solicitation messages may be received by one or more UEs 404, 406, 408, 410. For example, as illustrated, UE 404 and UE 406 may transmit response messages 460, 462 back to UE 402 to facilitate connection on sidelink. For instance, the UE 402 may perform channel measurements to select one of the UEs 404, 406 having the highest link quality, and perform connection establishment with the selected UE.

In some cases, for sidelink communications over the Frequency Range 2 (FR2, e.g., including frequency bands from 24.25 GHz to 52.6 GHz, also known as millimeter wave range), or similar frequency range that is subject to path loss (attenuation), therefore, beamforming is required to enable communications over a practical range to mitigate the directional nature of the high frequency beams. Such beamforming requires exhaustive beam search and periodic beam training for maintenance, burdening energy efficiency and overhead.

In addition, sidelink FR2 communications may be more challenging due to the practical scenario where many UEs may form beam pair links (BPLs) with each other, unlike the beamforming situation with a base station (including for the Uu link in sidelink) where each UE needs only to form a BPL with one base station (gNB). Due to this distributed nature of the network, system-wide resources need to be allocated for beam training. These resources are periodic. The UEs may transmit beam training reference signals (BT-RS, or BT-RS sequences) over beam training occasions. The receiver (Rx) UEs may detect the BT-RS and send feedback (e.g., random access channel, "RACH") on the dominant beam. The beam training is performed as an exhaustive beam search and sweep through the entire 360-degree angular space at the transmitter (Tx) UE and the Rx UE (e.g., N×N beams).

Once the Tx UE and the Rx UE have established possible BPLs through the beam scan, the UEs may perform a device discovery to establish communications for various applications. The device discovery requires knowing the UE identifiers (ID) (e.g., layer 2 ID) for sub-6 operations.

Figure 5:
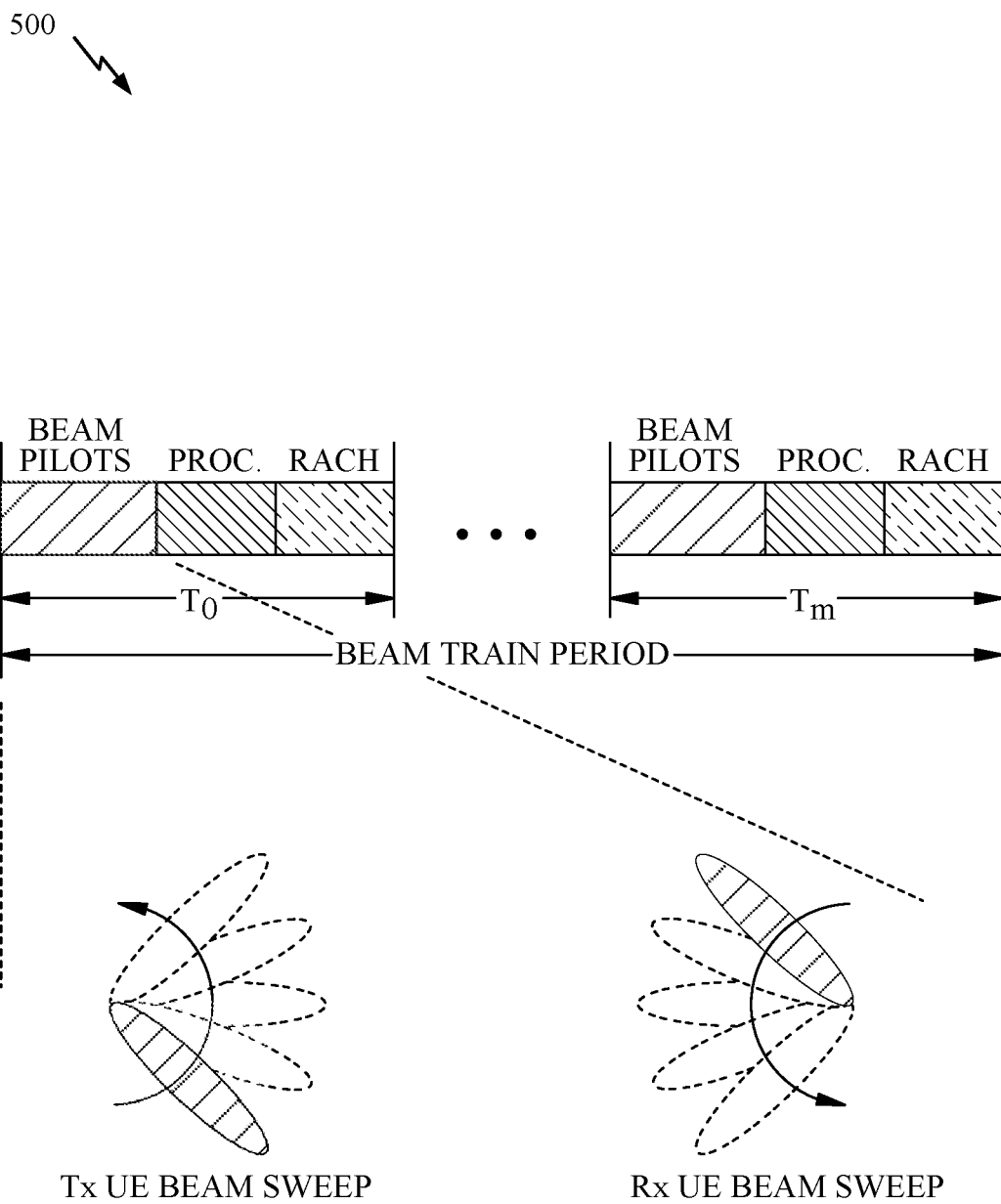
FIG. 5 illustrates an example beam training period between two UEs in sidelink communication, in accordance with certain aspects of the present disclosure.

FIG. 5 illustrates an example beam training period between two UEs in sidelink communication, in accordance with certain aspects of the present disclosure. As shown, the beam training period includes a number of training cycles $T_0, T_1, \ldots T_m$. Each of the training cycle $T_m$ may include three events: (1) transmitting a number of beam pilots in multiple directions; (2) processing the beam pilots to identify a direction of a desirable signal strength; and (3) sending a random access channel (RACH) sequence on the identified direction. Completing the beam training would enable the Tx UE and the Rx UE aware of the beam directions.

For example, the Tx UE on the bottom left of FIG. 5 may first transmit multiple pilot beams in various directions, such as exhaustively over 360 degrees. The Rx UE on the bottom right of FIG. 5 may similarly perform a beam sweep. Upon completion of beam sweep, the Rx UE determines a dominant direction for every BT-RS sequence received from the Tx UE. Each Tx UE may have an orthogonal BT-RS. The Rx UE then processes the beam pilots and transmits a RACH sequence on the dominant directions to the Tx UE.

In order to have the Tx UE and the Rx UE discover each other, the UEs must associate a BPL to the other UE. This discovery allows the UEs to identify the devices and upper layer services. Because the FR2 links often have high overhead to establish and maintain, it is beneficial for the UEs to establish and/or maintain trained or paired links for relevant services. As such, operations may save time that is often consumed by creating and tearing down unnecessary links.

The present disclosure enables transmissions of discovery messages on device level and service level discoveries. The discovery message may also include beamforming information for reception and future beam association or directional communications. Due to the directional nature of millimeter waves, such as links at FR2, there is no system-wide resources for discovery messages. There is no broadcasting of the directional messages.

In some cases, the discovery message may include the device ID of the UE. The current and possible future device locations may also be included in the discovery message. For example, the location information may be gathered by the UE based on the current zone ID and the UE's direction of motion and/or acceleration. The location or change of location of the Tx UE may be used by the Rx UE to determine the Tx UE's trajectory.

In some cases, the discovery message may include one or a list of application layer service IDs. The discovery message may also include meta data for one or more of the services listed in the service ID. The discovery message may further include beam and directional information. For example, the discover messages may indicate the beam training pilot used by this UE for current and future beam training periods. In some cases the discovery message will also contain the beam training occasions that the Tx UE uses in the future beam training periods. The UE may also send a time domain division (TDD) pattern for the beam corresponding to one directional discovery message. The TDD pattern is used by the receiver to transmit the discovery response. The UE receiving the discovery message searches for a PSSCH resources in the slots indicated in the TDD pattern to transmit the discovery response.

The device and service information may be used by the UEs to manage the beamformed links. In one case, the service ID and the meta data is used to accept or reject the discovery advertisement/discovery announcement. The Rx UE may reject the discovery message if it does not support the service. The Rx UE may infer that the service information from the Tx UE is not relevant. For example, information from a vehicle (i.e., a Rx UE in a V2X sidelink scenario) behind the Tx UE on another lane may be irrelevant and not used by the Rx UE. In one case, the service Id, meta data, with the device location and trajectory may be used to accept/reject discovery.

In view of the device-service specific discovery message discussed above, the Model A discovery and Model B discovery discussed in FIGS. 4A-4B may each exhibit the following characteristics. In Model A discovery, the Rx UE may transmit one or more RACH to the Tx UE during the beam training period. The Rx UE also transmits a discovery advertisement over each direction it had sent a RACH on. The discovery advertisement may contain the BT-RS sequence ID used by the Tx UE for beam training. The discovery advertisement may also include one or more future beam training occasions within a BT period. The discovery advertisement is transmitted over the PSSCH (as further discussed in FIG. 6), and may be made using shared channel resource reservation procedure. The receiver (e.g., the Tx UE) of the discovery advertisement may send a discovery response. In some cases, when the Tx UE receives the discovery advertisement and is not interested, the Tx UE may still send a discovery response indicating rejection. In some cases, the Tx UE may not send any discovery response regarding the received discovery advertisement.

In Model B discovery, the Tx UE that has transmitted the beam training pilots may send discovery message in the direction that the Tx UE receives a RACH from the Rx UE. The Tx UE transmits a discovery announcement to the Rx UE, which, upon receiving the discovery announcement, determines whether to discover on a device or a service level the Tx UE based on the UE ID or service ID indicated in the discovery announcement. If the Rx UE determines that the device or service is of interest, the Rx UE may transmit a discovery response based on the time domain division (TDD) pattern of the discovery announcement.

Example Techniques for Sidelink FR2 Discovery

Certain aspects of the present disclosure to techniques for sidelink discovery in millimeter wave (e.g., Frequency Range 2, or FR2) bands. For example, a UE may generate a sidelink discovery message including device information of the UE and non-device information; output the sidelink discovery message for transmission; and establish a sidelink connection with a receiver (Rx) UE after the output of the sidelink discovery message. The UE may identify the devices and upper layer services before performing discovery or giving up beam-trained links. The discovery procedure can thus make use of existing beam trained links even when different services are involved. In some cases, the discovery message may include beamforming information for reception and future beam association. The discovery message may be transmitted directionally and not broadcasted. The discovery message need not use system-wide resources. The discovery message may include other information to enable future directional communications.

As discussed above, because of inherent path loss at high frequency ranges (such as FR2), wireless links often require beamforming and spatial filtering to achieve sufficient range. In relatively low frequency ranges (such as FR1), links may be transmitted omnidirectionally or with wide beams, such that beamforming is not needed. In cases involving multiple UEs, each sidelink UE may form multiple beam pair links (BPLs) with other sidelink UEs (or peer UEs). The involved beam discovery process may thus have a higher overhead than the beam discovery process between a UE and a base station (such as gNB or eNB in a Uu link).

Figure 6:
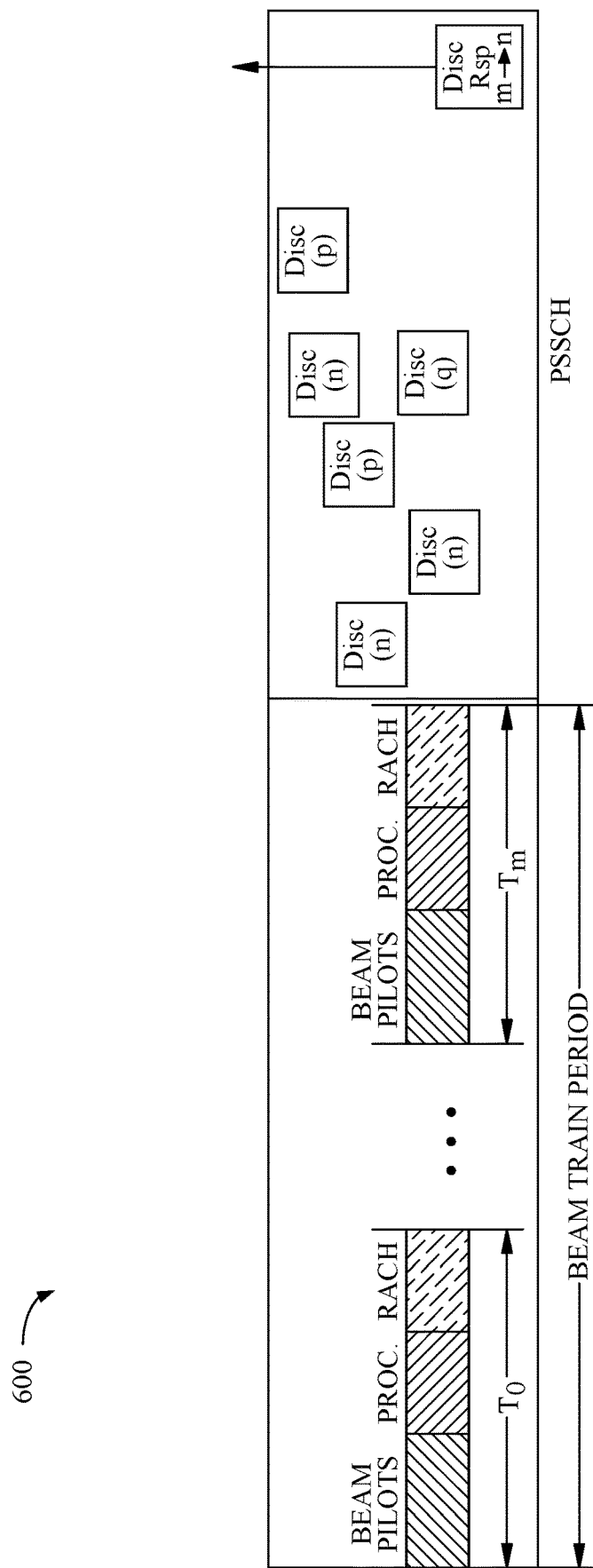
FIG. 6 illustrates an example re-discovery procedure using sidelink communication between two UEs, in accordance with certain aspects of the present disclosure.

FIG. 6 illustrates an example re-discovery procedure using sidelink communication between two UEs, in accordance with certain aspects of the present disclosure. As shown, discoveries using PSSCH are performed after the beam training period. During the beam training period, system-wide resources may be used for beam discovery. The beam training process may use a long beam training period that repeats over a large time scale. For example, a beam training period of 100 ms may repeat for every second, resulting in a 10% overhead. By comparison, a 5 ms beam training period may be used every 20 ms synchronization period for beam training for a Uu link between a UE and a base station.

An initial BPL may be established after the beam training period. The Tx UE and the Rx UEs may then use the PSSCH to transmit and/or receive beam discovery messages for device and service discoveries. As shown, various discovery events may occur in PSSCH. By discerning over the device information and service information, either the Tx UE or the Rx UE may respond to the discovery message when interested. For example, the Rx UE may want to discover the Tx UE when the Tx UE is running an application that collects data useful to the Rx UE. In a V2X scenario, for example, the Rx UE may want to discover a Tx UE that collects visual or navigation information collected at the Tx UE and not directly available to the Rx UE. On the other hand, although beam training between the Tx UE and the Rx UE is successful and BPL can be established, either the Tx or Rx UE may decide that the information or application provided by the other UE is not of interest or relevant. For example, in a V2X scenario, some safety messages provided by a Tx UE of a front vehicle may not be useful when the Rx UE is associated with a vehicle of a different lane. Similarly, sensor data from a front camera may be useful for Rx UEs behind the Tx UE, but not for Rx UEs in the front.

The present disclosure provides techniques for FR2 device discovery using non-device information, such as service information. For example, due to the high overhead to establish and maintain FR2 links, it is beneficial for UEs to continue using existing FR2 links for relevant services. Using existing FR2 links may also reduce the time consumed by creating and tearing down FR2 links. The non-device information may also include beamforming information for reception and future beam association, or other information to enable future directional communications.

Figure 7:
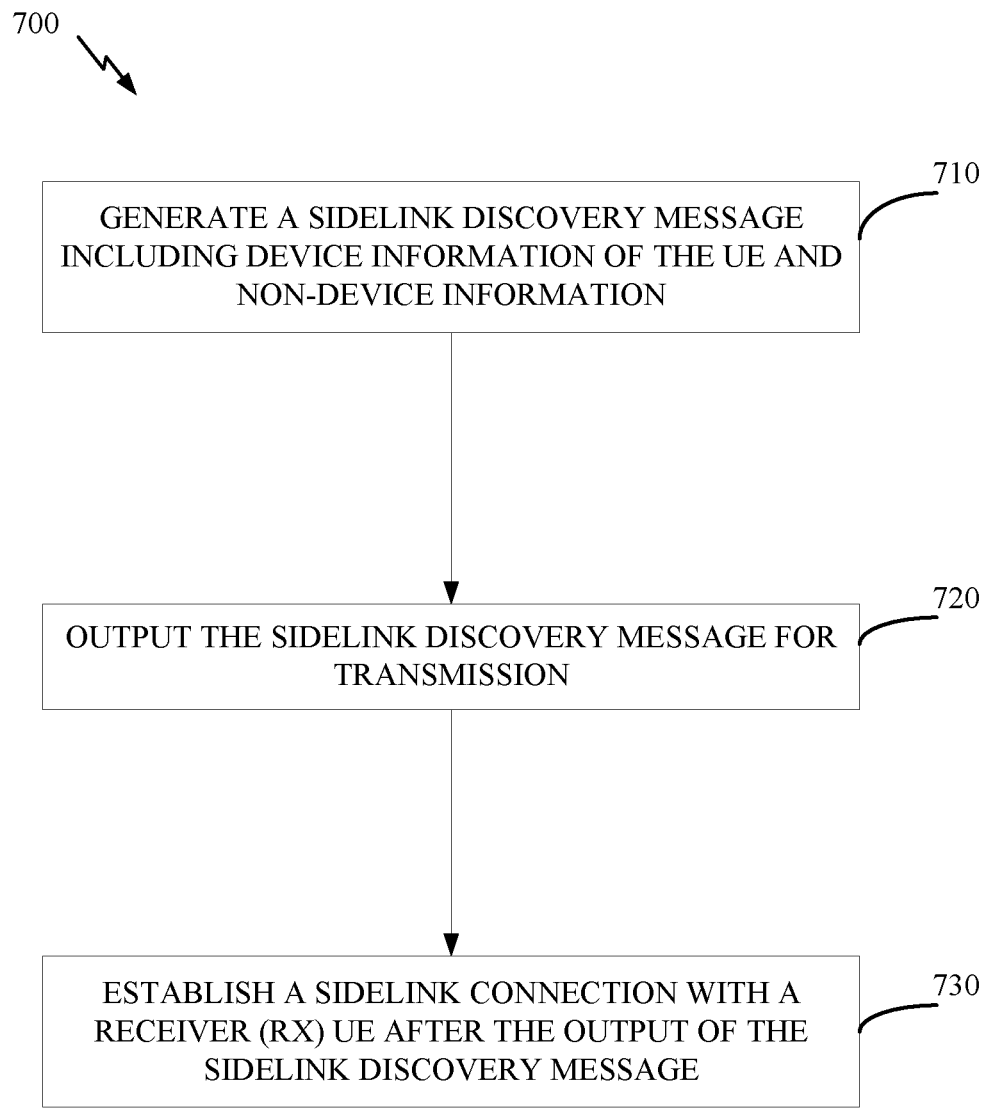
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a UE of FIGS. 3A, 3B, 4A, 4B, and 5.

Operations 700 may be implemented as software components that are executed and run on one or more processors (e.g., controller/processor 280 of FIG. 2). Further, the transmission and reception of signals by the relay UE in operations 700 may be enabled, for example, by one or more antennas (e.g., antennas 252 of FIG. 2). In certain aspects, the transmission and/or reception of signals by the relay UE may be implemented via a bus interface of one or more processors (e.g., controller/processor 280) obtaining and/or outputting signals.

The operations 700 may begin, at block 710, by generating a sidelink discovery message including device information of the UE and non-device information. At block 720, the UE outputs the sidelink discovery message for transmission. At block 730, the UE establishes a sidelink connection with a receiver (Rx) UE after the output of the sidelink discovery message. In certain aspects, outputting the sidelink discovery message may be equivalent to transmitting the sidelink discovery message. In different aspects, outputting the sidelink discovery message may be used for transmission.

In certain aspects, the UE may generate a sidelink discovery message that includes device information and non-device information, and establish a sidelink connection with the Rx UE based on the sidelink discovery message. In one aspect, the processing system or chipset of the UE outputs the sidelink discovery message for transmission. For example, the UE may generate the sidelink discovery message for use by a network entity (e.g., via Uu link). In such situation, the Rx UE may obtain the discovery message from the network entity and use the discovery message in either direction with respect to the UE to establish FR2 sidelink connections. In such cases, either the UE or the Rx UE may use the non-device information to determine whether a sidelink connection is to be established. In some cases, the at least one of the current location or the planned location of the UE may enable the Rx UE to determine a trajectory of the UE, such as when the UE may reach certain future locations.

In certain aspects, the non-device information includes service information. The non-device information enables the Rx UE to determine, based on the service information, whether to initiate a sidelink connection establishment, transmit a sidelink connection establishment request, or avoid establishing the sidelink connection with the UE. The service information may include at least one of a current location, a planned location, at least one application layer service identification (ID), or meta data for one or more services of the at least one application layer service ID. The planned location may be determined based on at least one of a current zone ID, a direction of motion of the UE, or a maneuver pattern of the UE (e.g., in the context of V2X traffic, the maneuver pattern may include lane changing).

In certain aspects, the non-device information includes beam information. The beam information may enable the Rx UE to determine whether to accept discovery requests, standby for discovery, send signals for discovery, or avoid establishing the sidelink connection with the UE. For example, the beam information may include at least one (including all) of an indication of at least one beam training pilot used by the UE for a current or a future beam training period, a time division duplex (TDD) pattern, or one or more beam training occasions of the UE. The TDD pattern may enable the Rx UE to transmit a discovery response. For example, the TDD pattern enables the Rx UE to search for at least one physical sidelink shared channel (PSSCH) resource in slots indicated in the TDD pattern, and to output a discovery response for transmission based on the at least one PSSCH resource.

In certain aspects, the UE may further transmit, along with the non-device information, one or more beam training resources during a current or future beam training period. Beam training resources may include storage and signal processing resources used for beam training. For example, the beam training resources may include random access channel (RACH), beam training reference signals (BT-RS) or both RACH and BTRS. In some cases, the beam training resources may include only beam training information. The beam training resources may indicate the best beam with the largest equivalent channel gain from possible beam pairs. Such information may allow the UE to evaluate beam allocation considerations when multi-UE beam conflicts exist. In some cases, the UE outputs a discovery advertisement message for transmission via one or more beam trained directions associated with the one or more beam training resources. The discovery advertisement message is outputted for transmission over the PSSCH.

In certain aspects, the UE may perform a shared channel resource reservation procedure prior to outputting the discovery advertisement message for transmission. The discovery advertisement message contains a beam training reference signal (BT-RS) identifier (ID) used by the UE for beam training. In some cases, the discovery advertisement message may include one or more future beam training occasions within a beam training period.

In certain aspects, the UE outputs a discovery announcement message for transmission via a direction associated with one of the one or more beam training resources over which the UE receives communication from the Rx UE.

Figure 8:
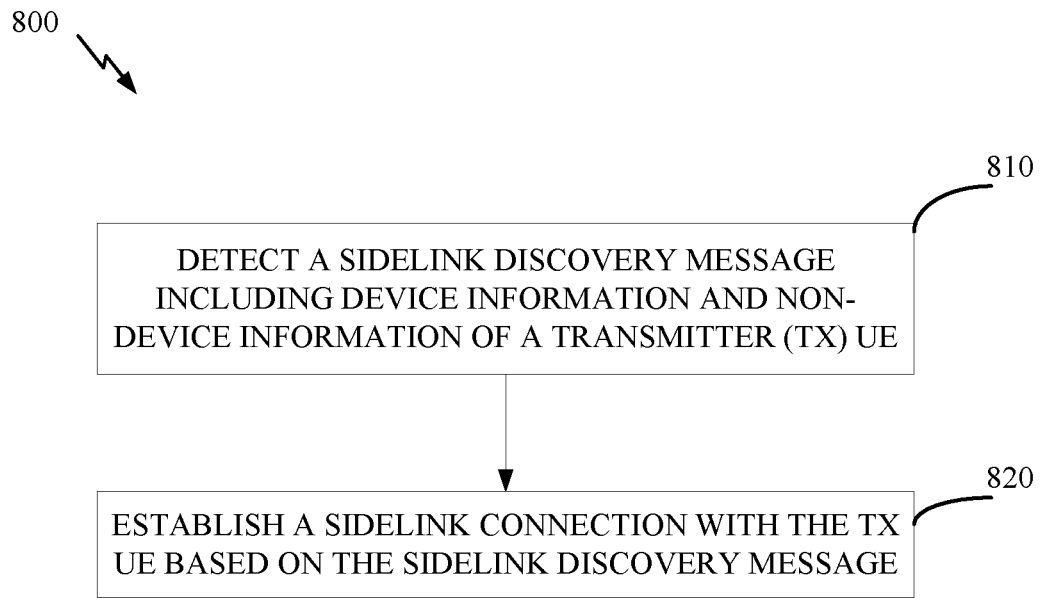
FIG. 8 is a flow diagram illustrating example operations for wireless communication, in accordance with certain aspects of the present disclosure.

FIG. 8 is a flow diagram illustrating example operations 800 for wireless communication, in accordance with certain aspects of the present disclosure. The operations 800 may be performed, for example, by an Rx UE in response to the UE of operations 700 (e.g., a corresponding UE in FIGS. 3A, 3B, 4A, 4B, and 5). The operations 800 may be complementary to the operations 700 of FIG. 7. As such, aspects described in FIG. 7 may similarly apply in FIG. 8.

Operations 800 may be implemented as software components that are executed and run on one or more processors (e.g., controller/processor 280 of FIG. 2). Further, the transmission and reception of signals by the remote UE in operations 600 may be enabled, for example, by one or more antennas (e.g., antennas 252 of FIG. 2). In certain aspects, the transmission and/or reception of signals by the remote UE may be implemented via a bus interface of one or more processors (e.g., controller/processor 280) obtaining and/or outputting signals.

The operations 800 may begin, at block 810, by detecting a sidelink discovery message including device information and non-device information of a transmitter (Tx) UE. At 820, the Rx UE establishes a sidelink connection with the Tx UE based on the sidelink discovery message. For example, when the Rx UE receives and analyzes the non-device information indicated in the discovery message, the Rx UE may accept or reject the discovery request by the Tx UE. In some cases, the discovery message may include service ID and meta data, in the form of either discovery advertisement or announcement. For example, the Rx UE may reject the discovery message if the Rx UE does not support the service indicated. The Rx UE may also infer that the service information from the Tx UE being not relevant and reject the discovery request.

In certain aspects, the UE obtains a discovery announcement message from the Tx UE in a direction associated with a random access channel (RACH) via which the sidelink discovery message was transmitted by the Tx UE. The UE determines, based on at least one of the device information or the non-device information of the sidelink discovery message, whether the UE is interested in establishing the sidelink connection with the Tx UE. The determination may be responsive to the discovery announcement message. In certain aspects, the non-device information includes service information. The UE may establish the sidelink connection with the Tx UE by evaluating the service information.

In certain aspects, the service information includes at least one of a current location, a planned location, at least one application layer service identification (ID), or meta data for one or more services of the at least one application layer service ID. The planned location is determined based on at least one of a current zone ID, a direction of motion of the Tx UE, or a maneuver pattern of the Tx UE. The UE may determine a trajectory of the Tx UE based on at least one of the current location or the planned location of the Tx UE. The UE may accept or reject the sidelink discovery message based on the current location and the trajectory of the Tx UE. In some cases, the UE may reject the sidelink discovery message when the at least one application layer service ID or the meta data does not support the one or more services.

In certain aspects, the UE may infer that the service information from the Tx UE is not relevant. For example, the service information includes a current location behind a position of the UE in a different driving lane. Thus the position of the UE in the different lane may not be relevant to the UE when the UE receives instructions to travel at a higher speed than the Tx UE (e.g., after overtaking and absent data indicating possible collision).

In certain aspects, the discovery message includes device and non-device information. The device information may include identification of the device, such as a device ID used for device discovery. The non-device information may include service information, location information, and other information (e.g., beamforming information). In some cases, the location information may include current or predicted future device locations (e.g., based on road map data and travel data). For example, the location information may be gathered by the UE based on a current zone ID, its direction of motion, and/or its travel pattern that indicates an intent, such as turning, lane changing, etc. The Rx UE may use the location information to determine a trajectory or a movement pattern of the Tx UE, which are used for determining whether device discovery is accepted or rejected. The service information may include identification of services provided, such as a service ID. The non-device information may further include meta data for one or more services listed in the service ID.

In certain aspects, the discovery message includes beam and direction information. For example, the discovery message may indicate the beam training pilot used by the UE generating the discovery message for current and/or future beam training. In some cases, the beam and directional information may also include beam training occasions the Tx UE uses in the future beam training periods. In some cases, the UE may also send the TDD pattern for the beam corresponding to one directional discovery message. For example, the TDD pattern may be used by the Rx UE to transmit the discovery response: the Rx UE receiving the discovery message may search for a PSSCH resource in the slots indicated in the TDD pattern to transmit the discovery response.

Figure 9:
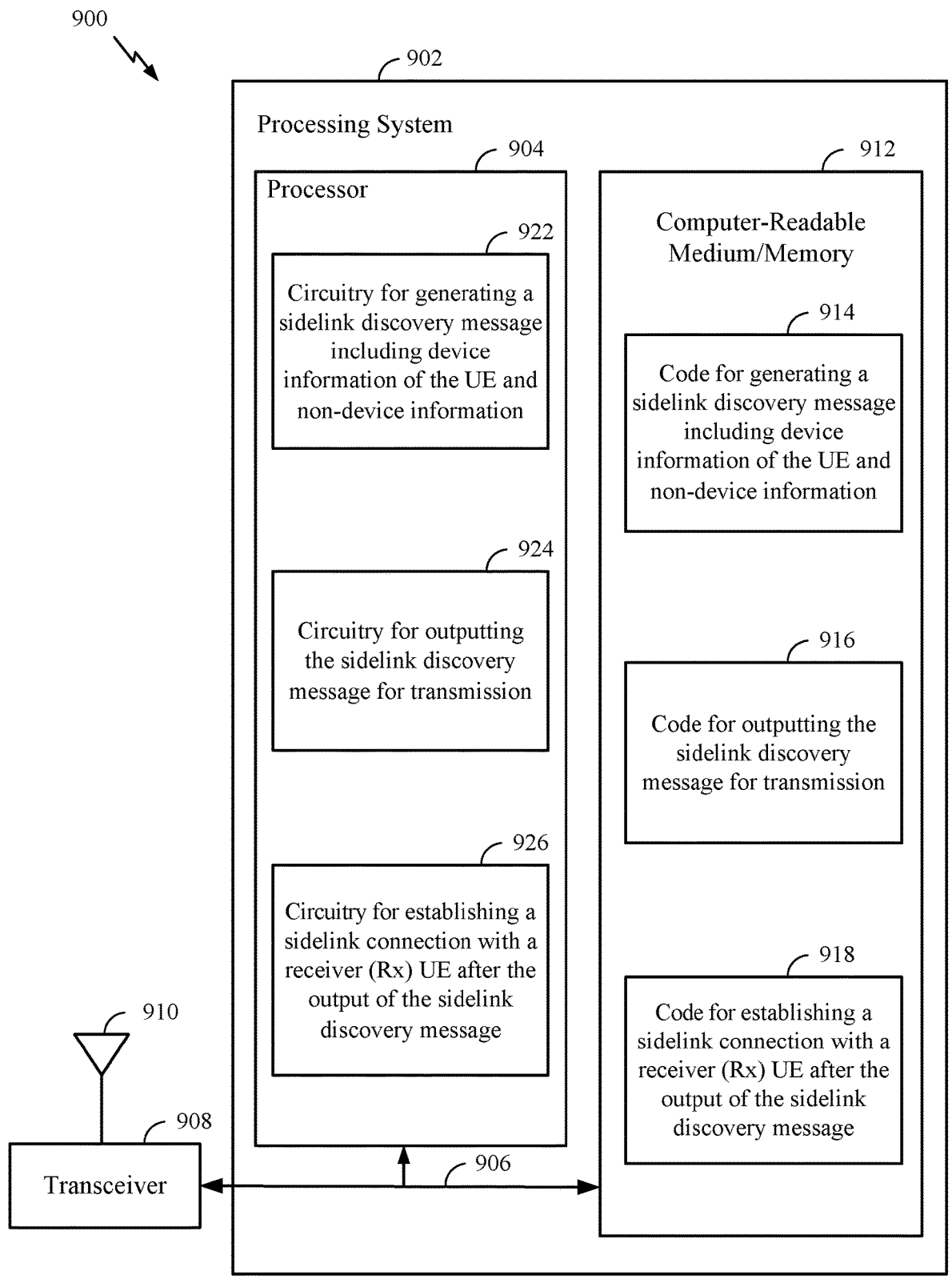
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIGS. 7 and 8. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 7 and 8. In certain aspects, computer-readable medium/memory 912 stores code 914 for generating a sidelink discovery message including device information of the UE and non-device information, code 916 for outputting the sidelink discovery message for transmission, and code 918 for establishing a sidelink connection with a receiver (Rx) UE after the output of the sidelink discovery message. In certain aspects, the processor 904 has circuitry configured to implement the code stored in the computer-readable medium/memory 912. The processor 904 includes circuitry 922 for generating a sidelink discovery message including device information of the UE and non-device information, circuitry 924 for outputting the sidelink discovery message for transmission, and circuitry 926 for establishing a sidelink connection with a receiver (Rx) UE after the output of the sidelink discovery message.

Figure 10:
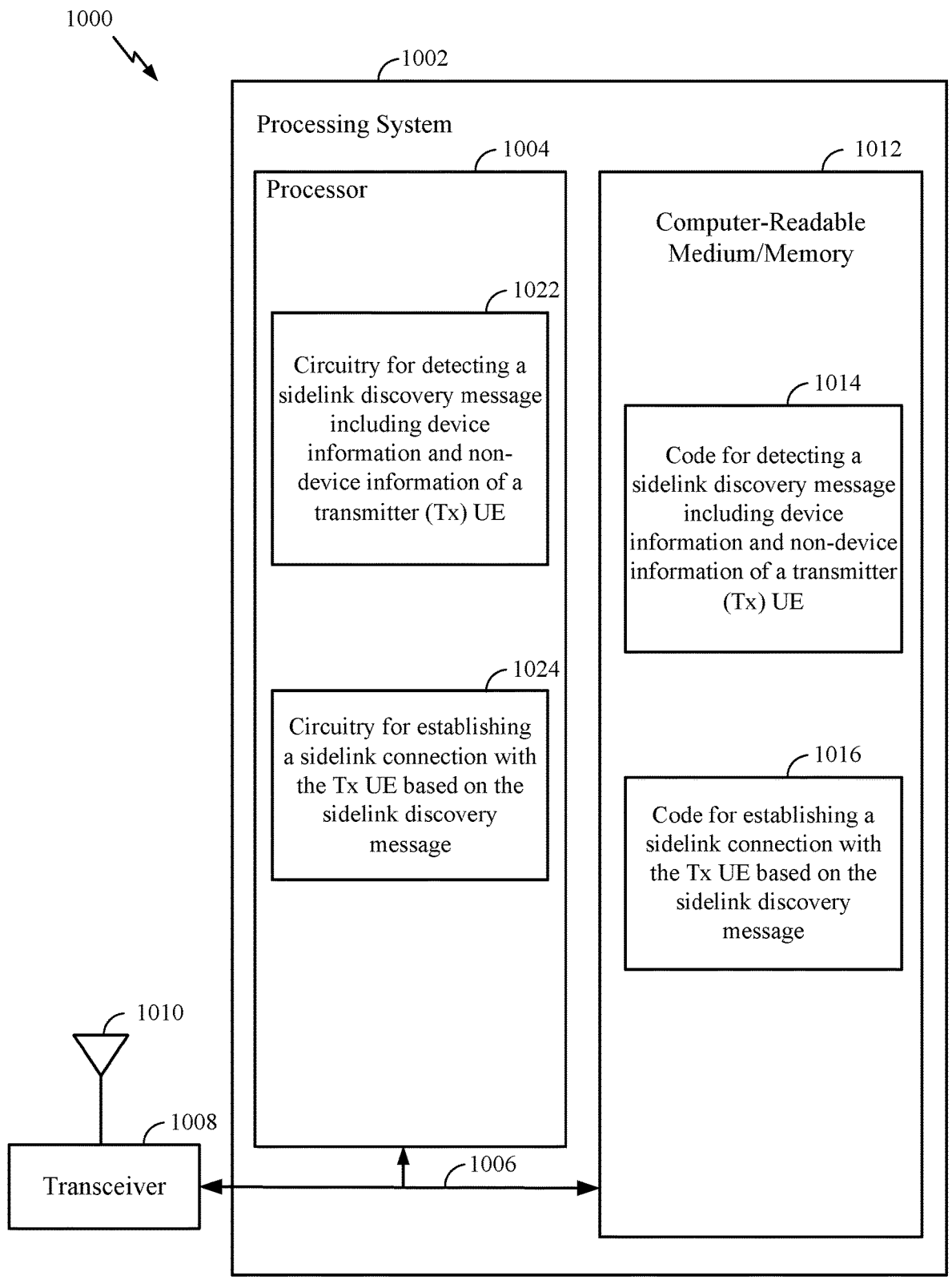
FIG. 10 illustrates a communications device that may include various components configured to perform operations for the techniques disclosed herein.

FIG. 10 illustrates a communications device 1000 that may include various components (e.g., corresponding to means-plus-function components) configured to perform operations for the techniques disclosed herein, such as the operations illustrated in FIGS. 7 and 8. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIGS. 7 and 8. In certain aspects, computer-readable medium/memory 1012 stores code 1014 for detecting a sidelink discovery message including device information and non-device information of a transmitter (Tx) UE; and code 1016 for establishing a sidelink connection with the Tx UE based on the sidelink discovery message. In certain aspects, the processor 1004 has circuitry configured to implement the code stored in the computer-readable medium/memory 1012. The processor 1004 includes circuitry 1022 for detecting a sidelink discovery message including device information and non-device information of a transmitter (Tx) UE; circuitry 1024 for establishing a sidelink connection with the Tx UE based on the sidelink discovery message.

In addition to the various aspects described above, aspects of specific combinations are within the scope of the disclosure, some of which are detailed below:

Aspect 1: A method for wireless communications by a user equipment (UE), comprising: generating a sidelink discovery message including device information of the UE and non-device information; outputting the sidelink discovery message for transmission; and establishing a sidelink connection with a receiver (Rx) UE after the output of the sidelink discovery message.

Aspect 2: The method of Aspect 1, wherein the non-device information includes service information, the non-device information enabling the Rx UE to determine, based on the service information, whether to avoid establishing the sidelink connection with the UE.

Aspect 3: The method of any one of Aspects 1-2, wherein the service information includes at least one of a current location, a planned location, at least one application layer service identification (ID), or meta data for one or more services of the at least one application layer service ID.

Aspect 4: The method of Aspect 3, wherein the planned location is determined based on at least one of a current zone ID, a direction of motion of the UE, or a maneuver pattern of the UE.

Aspect 5: The method of Aspect 3, wherein at least one of the current location or the planned location of the UE enable the Rx UE to determine a trajectory of the UE.

Aspect 6: The method of any one of Aspects 1-5, wherein the non-device information includes beam information, the beam information enabling the Rx UE to determine whether to avoid establishing the sidelink connection with the UE.

Aspect 7: The method of Aspect 6, wherein the beam information includes at least one of: an indication of at least one beam training pilot used by the UE for a current or a future beam training period; a time division duplex (TDD) pattern; or one or more beam training occasions of the UE.

Aspect 8: The method of Aspect 7, wherein the TDD pattern enables the Rx UE to transmit a discovery response.

Aspect 9: The method of Aspect 7, wherein the TDD pattern enables the Rx UE to search for at least one physical sidelink shared channel (PSSCH) resource in slots indicated in the TDD pattern, and to output a discovery response for transmission based on the at least one PSSCH resource.

Aspect 10: The method of Aspect 7, further comprising outputting, along with the non-device information, one or more beam training resources for transmission during a current or future beam training period.

Aspect 11: The method of Aspect 10, further comprising outputting a discovery advertisement message for transmission via one or more beam trained directions associated with the one or more beam training resources.

Aspect 12: The method of Aspect 11, wherein the discovery advertisement message is outputted for transmission over the PSSCH.

Aspect 13: The method of Aspect 11, further comprising, prior to outputting the discovery advertisement message for transmission, performing a shared channel resource reservation procedure.

Aspect 14: The method of Aspect 11, wherein the discovery advertisement message contains a beam training reference signal (BT-RS) identifier (ID) used by the UE for beam training.

Aspect 15: The method of Aspect 11, wherein the discovery advertisement message contains one or more future beam training occasions within a beam training period.

Aspect 16. The method of Aspect 10, outputting a discovery announcement message for transmission via a direction associated with one of the one or more beam training resources over which the UE receives communication from the Rx UE.

Aspect 17: A method for wireless communications by a user equipment (UE), comprising: detecting a sidelink discovery message including device information and non-device information of a transmitter (Tx) UE; and establishing a sidelink connection with the Tx UE based on the sidelink discovery message.

Aspect 18: The method of Aspect 17, further comprising: obtaining a discovery announcement message from the Tx UE in a direction associated with a random access channel (RACH) via which the sidelink discovery message was transmitted by the Tx UE; and determining, based on at least one of the device information or the non-device information of the sidelink discovery message, whether the UE is interested in establishing the sidelink connection with the Tx UE, said determination being responsive to the discovery announcement message.

Aspect 19: The method of any one of Aspects 17-18, wherein the non-device information includes service information, and wherein establishing the sidelink connection with the Tx UE comprises evaluating, based on the service information, whether to establish the sidelink connection with the Tx UE.

Aspect 20: The method of Aspect 19, wherein the service information includes at least one of a current location, a planned location, at least one application layer service identification (ID), or meta data for one or more services of the at least one application layer service ID.

Aspect 21: The method of Aspect 20, wherein the planned location is determined based on at least one of a current zone ID, a direction of motion of the Tx UE, or a maneuver pattern of the Tx UE.

Aspect 22: The method of Aspect 20, further comprising determining a trajectory of the Tx UE based on at least one of the current location or the planned location of the Tx UE.

Aspect 23: The method of Aspect 22, further comprising accepting or rejecting the sidelink discovery message based on the current location and the trajectory of the Tx UE.

Aspect 24. The method of Aspect 20, further comprising rejecting the sidelink discovery message when the at least one application layer service ID or the meta data does not support the one or more services.

Aspect 25: The method of Aspect 19, further comprising inferring that the service information from the Tx UE is not relevant.

Aspect 26: The method of Aspect 19, wherein the service information includes a current location behind a position of the UE in a different driving lane.

Aspect 27: The method of any one of Aspects 17-26, wherein the non-device information includes beam information, and further comprising determining, based on the beam information, whether to establish sidelink with the Tx UE.

Aspect 28: The method of Aspect 27, wherein the beam information includes at least one of: an indication of a beam training pilot used by the Tx UE for a current or a future beam training period; a time division duplex (TDD) pattern; or one or more beam training occasions of the Tx UE.

Aspect 29: The method of Aspect 28, further comprising outputting a discovery response for transmission using the TDD pattern in response to the detection of the sidelink discovery message.

Aspect 30: The method of Aspect 28, further comprising: searching for at least one physical sidelink shared channel (PSSCH) resource in slots indicated in the TDD pattern; and outputting a discovery response for transmission by using the at least one PSSCH resource.

Aspect 31: The method of Aspect 28, further comprising: obtaining a discovery advertisement message transmitted from the Tx UE via one or more beam directions as indicated by one or more random access channel (RACH) transmissions associated with the current or future beam training period; and outputting, in response to the discovery advertisement message, a discovery response for transmission in one of the beam directions.

Aspect 32: The method of Aspect 31, wherein the discovery response includes a rejection.

Aspect 33: The method of any one of Aspects 17-32, further comprising refraining from outputting a discovery response for transmission.

Aspect 34: The method of Aspect 28, further comprising: determining, based on the non-device information of the sidelink discovery message, that the UE is interested in the Tx UE; and outputting, based on the determination, a discovery response for transmission to the Tx UE based on the TDD pattern.

Aspect 35: A user equipment (UE), comprising: a processing system configured to generate a sidelink discovery message including device information of the UE and non-device information; and a transmitter configured to transmit the sidelink discovery message, wherein the processing system is further configured to establish a sidelink connection with a receiver (Rx) UE after the output of the sidelink discovery message.

Aspect 36: A user equipment (UE), comprising: at least one antenna; and a processing system configured to detect, via the at least one antenna, a sidelink discovery message including device information and non-device information of a transmitter (Tx) UE and establish, via the at least one antenna, a sidelink connection with the Tx UE based on the sidelink discovery message.

Aspect 37: An apparatus for wireless communications by a user equipment (UE), comprising: a processing system configured to generate a sidelink discovery message including device information of the UE and non-device information; and an interface configured to output the sidelink discovery message for transmission, wherein the processing system is further configured to establish a sidelink connection with a receiver (Rx) UE after the output of the sidelink discovery message.

Aspect 38: An apparatus for wireless communications by a user equipment (UE), comprising: a processing system configured to detect a sidelink discovery message including device information and non-device information of a transmitter (Tx) UE and establish a sidelink connection with the Tx UE based on the sidelink discovery message.

Aspect 39: An apparatus for wireless communications by a user equipment (UE), comprising: means for generating a sidelink discovery message including device information of the UE and non-device information; means for outputting the sidelink discovery message for transmission; and means for establishing a sidelink connection with a receiver (Rx) UE after the output of the sidelink discovery message.

Aspect 40: An apparatus for wireless communications by a user equipment (UE), comprising: means for detecting a sidelink discovery message including device information and non-device information of a transmitter (Tx) UE; and means for establishing a sidelink connection with the Tx UE based on the sidelink discovery message.

Aspect 41: A computer-readable medium for wireless communications by a user equipment (UE), comprising codes executable to: generate a sidelink discovery message including device information of the UE and non-device information; output the sidelink discovery message for transmission; and establish a sidelink connection with a receiver (Rx) UE after the output of the sidelink discovery message.

Aspect 42: A computer-readable medium for wireless communications by a user equipment (UE), comprising codes executable to: detect a sidelink discovery message including device information and non-device information of a transmitter (Tx) UE; and establish a sidelink connection with the Tx UE based on the sidelink discovery message.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link and include a UE or a network entity such as a BS. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 258, 264 and 266, and/or controller/processor 280 of the UE 120 and/or processors 220, 230, 238, and/or controller/processor 240 of the BS 110 shown in FIG. 2 may be configured to perform operations 700 of FIG. 7 and/or operations 800 of FIG. 8.

Means for receiving may include a transceiver, a receiver or at least one antenna and at least one receive processor illustrated in FIG. 2. Means for transmitting, means for sending or means for outputting may include, a transceiver, a transmitter or at least one antenna and at least one transmit processor illustrated in FIG. 2. Means for generating, means for establishing, means for performing, means for detecting, means for determining, means for accepting, means for rejecting, means for inferring and means for searching may include a processing system, which may include one or more processors, such as processors 258, 264 and 266, and/or controller/processor 280 of the UE 120 and/or processors 220, 230, 238, and/or controller/processor 240 of the BS 110 shown in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
generating a sidelink discovery message including device information of the UE and non-device information, wherein:
the non-device information includes beam information for enabling a receiver (Rx) UE to determine whether to avoid establishing a sidelink connection with the UE; and
the beam information includes at least one of:
an indication of at least one beam training pilot used by the UE for a current or a future beam training period;
a time division duplex (TDD) pattern; or
one or more beam training occasions of the UE;
outputting the sidelink discovery message for transmission; and
establishing a sidelink connection with Rx UE after the output of the sidelink discovery message.

2. The method of claim 1, wherein the non-device information includes service information, the non-device information enabling the Rx UE to determine, based on the service information, whether to avoid establishing the sidelink connection with the UE.

3. The method of claim 2, wherein the service information includes at least one of a current location, a planned location, at least one application layer service identification (ID), or meta data for one or more services of the at least one application layer service ID.

4. The method of claim 3, wherein the planned location is determined based on at least one of a current zone ID, a direction of motion of the UE, or a maneuver pattern of the UE or wherein at least one of the current location or the planned location of the UE enable the Rx UE to determine a trajectory of the UE.

5. The method of claim 1, wherein the TDD pattern enables the Rx UE to transmit a discovery response or wherein the TDD pattern enables the Rx UE to search for at least one physical sidelink shared channel (PSSCH) resource in slots indicated in the TDD pattern, and to output a discovery response for transmission based on the at least one PSSCH resource.

6. The method of claim 1, further comprising outputting, along with the non-device information, one or more beam training resources for transmission during a current or future beam training period.

7. The method of claim 6, further comprising outputting a discovery advertisement message for transmission via one or more beam trained directions associated with the one or more beam training resources.

8. The method of claim 7, wherein:
the discovery advertisement message is outputted for transmission over the PSSCH;
the discovery advertisement message contains a beam training reference signal (BT-RS) identifier (ID) used by the UE for beam training; or
the discovery advertisement message contains one or more future beam training occasions within a beam training period.

9. The method of claim 7, further comprising, prior to outputting the discovery advertisement message for transmission, performing a shared channel resource reservation procedure.

10. The method of claim 6, outputting a discovery announcement message for transmission via a direction associated with one of the one or more beam training resources over which the UE receives communication from the Rx UE.

11. A method for wireless communications by a user equipment (UE), comprising:
detecting a sidelink discovery message including device information and non-device information of a transmitter (Tx) UE, wherein:
the non-device information includes beam information; and
the beam information includes at least one of:
an indication of at least one beam training pilot used by the Tx UE for a current or a future beam training period;
a time division duplex (TDD) pattern; or
one or more beam training occasions of the Tx UE; and
establishing a sidelink connection with the Tx UE based on the sidelink discovery message.

12. The method of claim 11, further comprising:
obtaining a discovery announcement message from the Tx UE in a direction associated with a random access channel (RACH) via which the sidelink discovery message was transmitted by the Tx UE; and
determining, based on at least one of the device information or the non-device information of the sidelink discovery message, whether the UE is interested in establishing the sidelink connection with the Tx UE, said determination being responsive to the discovery announcement message.

13. The method of claim 11, wherein the non-device information includes service information, and wherein establishing the sidelink connection with the Tx UE comprises evaluating, based on the service information, whether to establish the sidelink connection with the Tx UE.

14. The method of claim 13, wherein the service information includes at least one of a current location, a planned location, at least one application layer service identification (ID), or meta data for one or more services of the at least one application layer service ID.

15. The method of claim 14, wherein the planned location is determined based on at least one of a current zone ID, a direction of motion of the Tx UE, or a maneuver pattern of the Tx UE.

16. The method of claim 14, further comprising determining a trajectory of the Tx UE based on at least one of the current location or the planned location of the Tx UE.

17. The method of claim 16, further comprising accepting or rejecting the sidelink discovery message based on the current location and the trajectory of the Tx UE.

18. The method of claim 14, further comprising rejecting the sidelink discovery message when the at least one application layer service ID or the meta data does not support the one or more services.

19. The method of claim 13, further comprising inferring that the service information from the Tx UE is not relevant.

20. The method of claim 13, wherein the service information includes a current location behind a position of the UE in a different driving lane.

21. The method of claim 11, further comprising outputting a discovery response for transmission using the TDD pattern in response to the detection of the sidelink discovery message.

22. The method of claim 11, further comprising:
searching for at least one physical sidelink shared channel (PSSCH) resource in slots indicated in the TDD pattern; and
outputting a discovery response for transmission by using the at least one PSSCH resource.

23. The method of claim 11, further comprising:
obtaining a discovery advertisement message transmitted from the Tx UE via one or more beam directions as indicated by one or more random access channel (RACH) transmissions associated with the current or future beam training period; and
outputting, in response to the discovery advertisement message, a discovery response for transmission in one of the beam directions.

24. The method of claim 23, wherein the discovery response includes a rejection.

25. The method of claim 11, further comprising refraining from outputting a discovery response for transmission.

26. The method of claim 11, further comprising:
determining, based on the non-device information of the sidelink discovery message, that the UE is interested in the Tx UE; and
outputting, based on the determination, a discovery response for transmission to the Tx UE based on the TDD pattern.

* * * * *